(12) United States Patent
Lisseman et al.

(10) Patent No.: US 9,829,980 B2
(45) Date of Patent: Nov. 28, 2017

(54) SELF-CALIBRATING TACTILE HAPTIC MUTI-TOUCH, MULTIFUNCTION SWITCH PANEL

(71) Applicant: TK Holdings Inc., Auburn Hills, MI (US)

(72) Inventors: Jason Lisseman, Shelby Township, MI (US); David Andrews, Ortonville, MI (US)

(73) Assignee: TK Holdings Inc., Auburn Hills, MI (US)

( * ) Notice: Subject to any disclaimer, the term of this patent is extended or adjusted under 35 U.S.C. 154(b) by 415 days.

(21) Appl. No.: 14/509,560

(22) Filed: Oct. 8, 2014

(65) Prior Publication Data

US 2015/0097796 A1 Apr. 9, 2015

Related U.S. Application Data

(60) Provisional application No. 61/888,322, filed on Oct. 8, 2013, provisional application No. 61/891,231, filed on Oct. 15, 2013.

(51) Int. Cl.
*G06F 3/01* (2006.01)
*B62D 1/04* (2006.01)
(Continued)

(52) U.S. Cl.
CPC .............. *G06F 3/016* (2013.01); *B62D 1/04* (2013.01); *G06F 3/0414* (2013.01);
(Continued)

(58) Field of Classification Search
CPC ...... G06F 3/016; G06F 3/0418; G06F 3/0414; G06F 3/167; G06F 2203/04106; G06F 2203/04104; B62D 1/04
See application file for complete search history.

(56) References Cited

U.S. PATENT DOCUMENTS 4,484,026 A  11/1984  Thornburg
4,540,979 A   9/1985  Gerger et al.
(Continued)

FOREIGN PATENT DOCUMENTS

EP  1607850 A2  12/2005
JP  H06-037056 U  5/1994
(Continued)

OTHER PUBLICATIONS

Co-pending U.S. Appl. No. 14/509,598, filed Oct. 8, 2014, and its file history.
(Continued)

*Primary Examiner* — Joseph Haley
*Assistant Examiner* — Karin Kiyabu
(74) *Attorney, Agent, or Firm* — Meunier Carlin & Curfman LLC

(57) ABSTRACT

A method for determining parameters associated with a haptic feedback output comprises detecting a vibration of at least a portion of a human-machine interface and determining a magnitude associated with the detected vibration. A calibration offset is determined based, at least in part, on the determined magnitude associated with the detected vibration. The method further comprises establishing at least one parameter associated with a haptic actuator of the human-machine interface based on the estimated calibration offset, the at least one parameter at least partially defining a haptic response generated by the haptic actuator.

20 Claims, 12 Drawing Sheets

(51) Int. Cl.
*G06F 3/041* (2006.01)
*G06F 3/16* (2006.01)

(52) U.S. Cl.
CPC ............ *G06F 3/0418* (2013.01); *G06F 3/167* (2013.01); *G06F 2203/04104* (2013.01); *G06F 2203/04106* (2013.01)

(56) References Cited

U.S. PATENT DOCUMENTS

| | | |
|---|---|---|
| 4,801,771 A | 1/1989 | Mizuguchi et al. |
| 4,929,934 A | 5/1990 | Ueda et al. |
| 5,398,962 A | 3/1995 | Kropp |
| 5,408,873 A | 4/1995 | Schmidt et al. |
| 5,423,569 A | 6/1995 | Reighard et al. |
| 5,453,941 A | 9/1995 | Yoshikawa |
| 5,463,258 A | 10/1995 | Filion et al. |
| 5,539,259 A | 7/1996 | Filion et al. |
| 5,793,297 A | 8/1998 | Takeuchi et al. |
| 5,871,063 A | 2/1999 | Young |
| 5,914,658 A | 6/1999 | Arakawa |
| 5,943,044 A | 8/1999 | Martinelli et al. |
| 5,965,952 A | 10/1999 | Podoloff et al. |
| 6,333,736 B1 | 12/2001 | Sandbach |
| 6,378,384 B1 | 4/2002 | Atkinson et al. |
| 6,429,846 B2 | 8/2002 | Rosenberg et al. |
| 6,501,463 B1 | 12/2002 | Dahley et al. |
| 6,636,197 B1 | 10/2003 | Goldenberg et al. |
| 6,809,462 B2 | 10/2004 | Pelrine et al. |
| 6,906,700 B1 | 6/2005 | Armstrong |
| 6,933,920 B2 | 8/2005 | Lacroix et al. |
| 7,126,583 B1 | 10/2006 | Breed |
| 7,136,051 B2 | 11/2006 | Hein et al. |
| 7,258,026 B2 | 8/2007 | Papakostas et al. |
| 7,649,278 B2 | 1/2010 | Yoshida et al. |
| 8,203,454 B2 | 6/2012 | Knight et al. |
| 8,214,105 B2 | 7/2012 | Daly et al. |
| 8,222,799 B2 | 7/2012 | Polyakov et al. |
| 8,237,324 B2 | 8/2012 | Pei et al. |
| 8,269,731 B2 | 9/2012 | Molne |
| 8,698,764 B1 | 4/2014 | Karakotsios et al. |
| 9,244,562 B1* | 1/2016 | Rosenberg .......... G06F 3/04847 |
| 2002/0041164 A1 | 4/2002 | Kim |
| 2002/0054060 A1 | 5/2002 | Schena |
| 2003/0043014 A1 | 3/2003 | Nakazawa et al. |
| 2003/0076968 A1 | 4/2003 | Rast |
| 2003/0083131 A1 | 5/2003 | Armstrong |
| 2004/0195031 A1 | 10/2004 | Nagasaka |
| 2004/0207605 A1 | 10/2004 | MacKey et al. |
| 2005/0021190 A1 | 1/2005 | Worrell et al. |
| 2005/0052426 A1 | 3/2005 | Hagermoser et al. |
| 2005/0067889 A1 | 3/2005 | Chernoff et al. |
| 2005/0110769 A1 | 5/2005 | DaCosta et al. |
| 2005/0156892 A1 | 7/2005 | Grant |
| 2005/0273218 A1 | 12/2005 | Breed et al. |
| 2006/0025897 A1* | 2/2006 | Shostak ................ B60C 23/005 701/1 |
| 2006/0054479 A1 | 3/2006 | Iisaka et al. |
| 2006/0076855 A1 | 4/2006 | Eriksen et al. |
| 2006/0109256 A1 | 5/2006 | Grant |
| 2006/0113880 A1 | 6/2006 | Pei et al. |
| 2006/0177212 A1 | 8/2006 | Lamborghini et al. |
| 2006/0248478 A1 | 11/2006 | Liau |
| 2006/0262103 A1 | 11/2006 | Hu |
| 2006/0284839 A1 | 12/2006 | Breed |
| 2007/0062753 A1 | 3/2007 | Yoshida et al. |
| 2007/0097073 A1 | 5/2007 | Takashima et al. |
| 2007/0100523 A1 | 5/2007 | Trachte |
| 2007/0287494 A1* | 12/2007 | You ......................... H04M 1/23 455/550.1 |
| 2008/0012837 A1 | 1/2008 | Marriott et al. |
| 2008/0062145 A1 | 3/2008 | Shahoian |
| 2008/0079604 A1 | 4/2008 | Madonna et al. |
| 2008/0202912 A1 | 8/2008 | Boddie et al. |
| 2008/0230283 A1 | 9/2008 | Yoon et al. |
| 2008/0264183 A1 | 10/2008 | Graham et al. |
| 2008/0289887 A1* | 11/2008 | Flint ..................... G06F 3/0414 178/18.03 |
| 2009/0001855 A1 | 1/2009 | Lipton |
| 2009/0125811 A1 | 5/2009 | Bethurum |
| 2009/0140994 A1 | 6/2009 | Tanaka et al. |
| 2009/0140996 A1 | 6/2009 | Takashima et al. |
| 2009/0151447 A1 | 6/2009 | Jin et al. |
| 2009/0153340 A1 | 6/2009 | Pinder et al. |
| 2009/0160529 A1 | 6/2009 | Lamborghini et al. |
| 2009/0189749 A1 | 7/2009 | Salada |
| 2009/0228791 A1* | 9/2009 | Kim ..................... G06F 3/0414 715/702 |
| 2009/0241378 A1 | 10/2009 | Ellis |
| 2010/0001974 A1 | 1/2010 | Su et al. |
| 2010/0045612 A1 | 2/2010 | Molne |
| 2010/0053087 A1 | 3/2010 | Dai |
| 2010/0066512 A1 | 3/2010 | Rank |
| 2010/0141606 A1* | 6/2010 | Bae ........................ G06F 3/016 345/174 |
| 2010/0168998 A1 | 7/2010 | Matsunaga |
| 2010/0200375 A1 | 8/2010 | Han et al. |
| 2010/0236911 A1* | 9/2010 | Wild ..................... H01H 3/022 200/345 |
| 2010/0250066 A1 | 9/2010 | Eckstein et al. |
| 2010/0250071 A1 | 9/2010 | Pala et al. |
| 2010/0268426 A1 | 10/2010 | Pathak |
| 2010/0302177 A1 | 12/2010 | Kim et al. |
| 2010/0315267 A1 | 12/2010 | Chung et al. |
| 2010/0321310 A1 | 12/2010 | Kim et al. |
| 2011/0037721 A1 | 2/2011 | Cranfill et al. |
| 2011/0046788 A1 | 2/2011 | Daly et al. |
| 2011/0054359 A1 | 3/2011 | Sazonov et al. |
| 2011/0069021 A1 | 3/2011 | Hill |
| 2011/0109552 A1 | 5/2011 | Yasutake |
| 2011/0141052 A1 | 6/2011 | Bernstein et al. |
| 2011/0148608 A1* | 6/2011 | Grant ..................... G06F 1/1626 340/407.2 |
| 2011/0175844 A1 | 7/2011 | Berggren |
| 2011/0210926 A1 | 9/2011 | Pasquero et al. |
| 2011/0216015 A1 | 9/2011 | Edwards |
| 2011/0241850 A1 | 10/2011 | Bosch et al. |
| 2011/0245992 A1 | 10/2011 | Stahlin et al. |
| 2011/0248728 A1 | 10/2011 | Maruyama et al. |
| 2011/0255023 A1 | 10/2011 | Doyle et al. |
| 2011/0260983 A1 | 10/2011 | Pertuit et al. |
| 2011/0267181 A1 | 11/2011 | Kildal |
| 2011/0279380 A1 | 11/2011 | Weber et al. |
| 2011/0290038 A1 | 12/2011 | Hoshino et al. |
| 2012/0013573 A1 | 1/2012 | Liu et al. |
| 2012/0038468 A1 | 2/2012 | Provancher |
| 2012/0039494 A1 | 2/2012 | Ellis |
| 2012/0105367 A1 | 5/2012 | Son et al. |
| 2012/0120009 A1 | 5/2012 | Lussey et al. |
| 2012/0126959 A1 | 5/2012 | Zarrabi et al. |
| 2012/0127115 A1* | 5/2012 | Gannon ................ G06F 3/0418 345/174 |
| 2012/0169663 A1 | 7/2012 | Kim et al. |
| 2012/0223900 A1* | 9/2012 | Jiyama ................... G06F 3/041 345/173 |
| 2012/0229424 A1 | 9/2012 | Behles et al. |
| 2012/0267221 A1 | 10/2012 | Gohng et al. |
| 2012/0267222 A1 | 10/2012 | Gohng et al. |
| 2012/0296528 A1 | 11/2012 | Wellhoefer et al. |
| 2012/0299856 A1 | 11/2012 | Hasui |
| 2013/0016053 A1* | 1/2013 | Jung ....................... G06F 3/016 345/173 |
| 2013/0063380 A1 | 3/2013 | Wang et al. |
| 2013/0063389 A1 | 3/2013 | Moore |
| 2013/0093679 A1 | 4/2013 | Dickinson et al. |
| 2013/0096849 A1 | 4/2013 | Campbell et al. |
| 2013/0106691 A1 | 5/2013 | Rank |
| 2013/0113715 A1 | 5/2013 | Grant et al. |
| 2013/0113717 A1 | 5/2013 | Van Eerd et al. |
| 2013/0141396 A1 | 6/2013 | Lynn et al. |
| 2013/0147284 A1 | 6/2013 | Chun |
| 2013/0154938 A1 | 6/2013 | Arthur et al. |
| 2013/0222287 A1 | 8/2013 | Bae et al. |

(56) References Cited

U.S. PATENT DOCUMENTS

| | | | |
|---|---|---|---|
| 2013/0222310 A1 | 8/2013 | Birnbaum et al. | |
| 2013/0228023 A1* | 9/2013 | Drasnin | G06F 1/1618 |
| | | | 73/862.541 |
| 2013/0250213 A1 | 9/2013 | Tomomasa | |
| 2013/0250613 A1 | 9/2013 | Kamada | |
| 2013/0307788 A1 | 11/2013 | Rao et al. | |
| 2013/0342337 A1* | 12/2013 | Kiefer | G08B 6/00 |
| | | | 340/438 |
| 2014/0092025 A1 | 4/2014 | Pala et al. | |
| 2014/0114624 A1 | 4/2014 | Buchanan et al. | |
| 2014/0267076 A1* | 9/2014 | Birnbaum | B25J 13/025 |
| | | | 345/173 |
| 2014/0267113 A1 | 9/2014 | Lisseman et al. | |
| 2014/0267114 A1 | 9/2014 | Lisseman et al. | |
| 2014/0347176 A1* | 11/2014 | Modarres | G06F 3/016 |
| | | | 340/407.1 |
| 2015/0009168 A1* | 1/2015 | Levesque | H04M 19/04 |
| | | | 345/174 |
| 2015/0046825 A1 | 2/2015 | Li | |
| 2015/0097794 A1 | 4/2015 | Lisseman et al. | |
| 2015/0116205 A1 | 4/2015 | Westerman et al. | |
| 2015/0212571 A1 | 7/2015 | Kitada | |
| 2015/0309576 A1 | 10/2015 | Tissot | |
| 2016/0109949 A1* | 4/2016 | Park | G06F 3/016 |
| | | | 345/173 |
| 2016/0216764 A1* | 7/2016 | Morrell | G08B 6/00 |
| 2017/0075424 A1* | 3/2017 | Bernstein | G06F 3/016 |

FOREIGN PATENT DOCUMENTS

| | | | |
|---|---|---|---|
| JP | 2005-175815 | | 6/2005 |
| JP | 2008-181709 | | 8/2008 |
| JP | 2012-176640 A | * | 9/2012 |
| KR | 10-2006-0047110 | * | 5/2006 |
| KR | 1020100129424 | | 12/2010 |
| WO | 0188935 | | 11/2001 |
| WO | 2011008292 A1 | | 1/2011 |
| WO | 2013082293 A1 | | 6/2013 |

OTHER PUBLICATIONS

Co-pending U.S. Appl. No. 14/509,493, filed Oct. 8, 2014, and its file history.
Office Action dated Jun. 16, 2016, received in connection with U.S. Appl. No. 14/509,493.
Co-pending U.S. Appl. No. 14/509,462, filed Oct. 8, 2014, and its file history.
Co-pending U.S. Appl. No. 14/509,332, filed Oct. 8, 2014, and its file history.
Office Action dated May 3, 2016, received in connection with U.S. Appl. No. 14/509,332.
Co-pending U.S. Appl. No. 14/509,535, filed Oct. 8, 2014, and its file history.
Office Action dated Feb. 11, 2016, received in connection with U.S. Appl. No. 14/509,535.
Co-pending U.S. Appl. No. 14/291,845, filed May 30, 2014, and its file history.
Office Action dated Feb. 24, 2016, received in connection with U.S. Appl. No. 14/291,845.
Office Action dated Sep. 24, 2015, received in connection with U.S. Appl. No. 14/291,845.
Office Action dated Jun. 14, 2016, received in connection with U.S. Appl. No. 14/509,462.
International Preliminary Report on Patentability and Written Opinion, dated Apr. 12, 2016, received in connection with International Patent Application No. PCT/US2014/059639.
International Preliminary Report on Patentability and Written Opinion, dated Apr. 12, 2016, received in connection with International Patent Application No. PCT/US2014/059652.
International Preliminary Report on Patentability and Written Opinion, dated Apr. 12, 2016, received in connection with International Patent Application No. PCT/US2014/059657.
International Preliminary Report on Patentability and Written Opinion, dated Apr. 12, 2016, received in connection with International Patent Application No. PCT/US2014/059669.
International Preliminary Report on Patentability and Written Opinion, dated Apr. 12, 2016, received in connection with International Patent Application No. PCT/US2014/059673.
International Preliminary Report on Patentability and Written Opinion, dated Dec. 10, 2015, received in connection with International Patent Application No. PCT/US2014/040224.
Office Action dated Nov. 4, 2014, received in connection with JP Application No. 2011-075258.
Notice of Allowance issued in related U.S. Appl. No. 14/291,845, dated Sep. 29, 2016.
Office Action issued in related U.S. Appl. No. 14/509,332, dated Oct. 27, 2016.
Notice of Allowance issued in related U.S. Appl. No. 14/509,535, dated Aug. 3, 2016.
Office Action issued in related U.S. Appl. No. 14/509,462, dated Dec. 28, 2016.
Office Action issued in related U.S. Appl. No. 14/509,493, dated Dec. 28, 2016.
Office Action issued in related U.S. Appl. No. 13/673,463, dated Feb. 18, 2015.
Office Action issued in related U.S. Appl. No. 13/673,463, dated Aug. 20, 2015.
Office Action issued in related U.S. Appl. No. 13/673,463, dated Jan. 21, 2016.
Office Action issued in related U.S. Appl. No. 13/673,463, dated Aug. 24, 2016.
Office Action issued in related U.S. Appl. No. 14/509,598, dated Jan. 6, 2017.
Office Action dated Sep. 30, 2015 in U.S. Appl. No. 14/509,493, filed Oct. 8, 2014.
International Search Report and Written Opinion issued in related International Application No. PCT/US2014/059652 dated Dec. 22, 2014.
International Search Report and Written Opinion issued in related International Application No. PCT/US2014/059673 dated Jan. 9, 2015.
International Search Report and Written Opinion issued in related International Application No. PCT/2014/059669 dated Jan. 23, 2015.
International Search Report and Written Opinion issued in related International Application No. PCT/US2014/059657 dated Feb. 16, 2015.
International Search Report and Written Opinion issued in related International Application No. PCT/US2014/059639 dated Feb. 24, 2015.
International Search Report and Written Opinion issued in related International Application No. PCT/US2014/040224 dated Sep. 24, 2014.
Office Action issued in related U.S. Appl. No. 14/509,462, dated Jun. 9, 2017.
Office Action issued in related U.S. Appl. No. 14/291,845, dated Feb. 3, 2017.
Office Action in U.S. Appl. No. 15/230,786, dated Feb. 7, 2017.

* cited by examiner

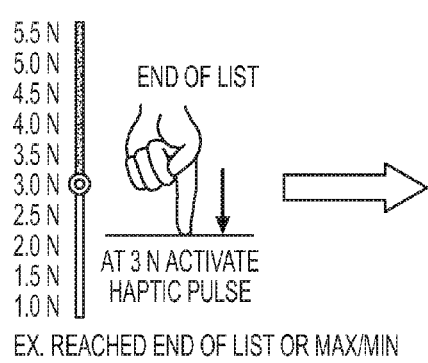
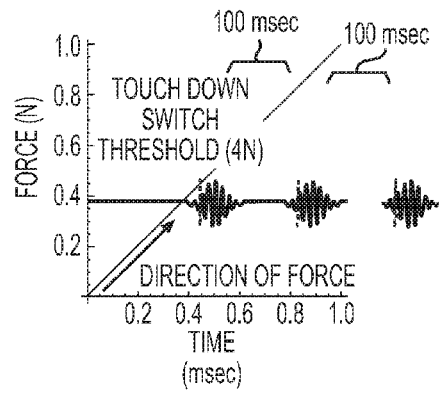
FIG. 8C
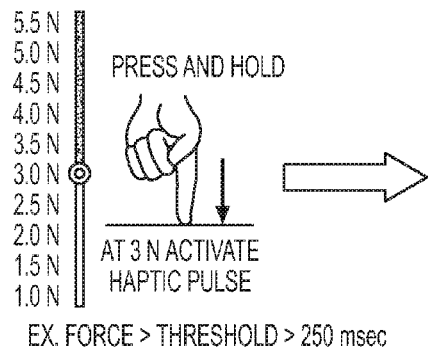
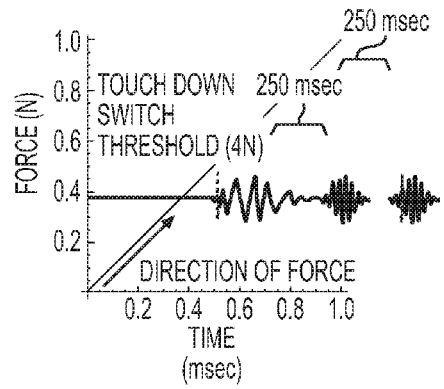
FIG. 8D

SELF-CALIBRATING TACTILE HAPTIC MUTI-TOUCH, MULTIFUNCTION SWITCH PANEL

CROSS-REFERENCE TO RELATED APPLICATION

This application claims the benefit of U.S. Provisional Application No. 61/888,322, filed Oct. 8, 2013, and U.S. Provisional Application No. 61/891,231, filed Oct. 15, 2013, each of which is incorporated herein by reference in its entirety.

TECHNICAL FIELD

The present disclosure relates generally to a tactile haptic switch panel and, more particularly, to a self-calibrating tactile haptic switch panel configured to account for the effects of ambient mechanical vibration associated with the environment in which the switch is deployed.

BACKGROUND

The recent widespread growth of feature-rich, relatively portable, and user-friendly consumer electronic devices has sparked a corresponding consumer demand for implementation of similar functionality in conventional appliances and utilitarian devices. For example, more consumers are demanding modern touchscreen interfaces in utility appliances like televisions, refrigerators, dishwashers, and washing machines. Even modern thermostats are integrating gesture-controllable, fully-networked and remotely accessible user interfaces (UIs). Even the automobile, often thought of as the quintessential utilitarian machine, has not been impervious to recent trends to incorporate as many options and features accessible to the driver as possible—from mechanical switch controls for climate, navigation, and radio systems integrated into the steering wheel, to touchscreen interfaces and camera displays integrated into the dashboard.

Although consumer demand for incorporating greater functionality into the automotive driving experience is growing rapidly, there are a number of problems with meeting such demand. First, conventional capacitive sense touchscreen technologies, such as those used in smartphones and tablet devices, while ideal for incorporating a large amount of functionality in a relatively limited space, require significant visual engagement by the driver and are therefore too distracting to be implemented safely. Second, while the conventional mechanical switches and knobs that are currently in use are less distracting because they can be safely used without requiring the driver to remove his eyes from the road, they tend to have limited flexibility, with each switch controlling a single function or feature.

One solution for combining the flexibility and versatility of touchscreen technologies while still allowing the driver to remain attentive for safely operating the vehicle involves the use of force-based haptic human-machine interfaces (HMIs). Force-based haptic HMIs typically include a sensor surface that is responsive to touch and an actuator for generating a responsive vibration (often simulating the response provided by a mechanical switch) that provides the driver with a tactile confirmation of an input on the touchscreen. These systems incorporate the haptic feedback that drivers have come to rely on of mechanical switches with the multi-touch, multifunction flexibility of touchscreen controls.

One problem with force-based haptic HMIs, particularly in automobiles and other mechanical systems, is that ambient mechanical vibrations associated with normal operation of the machine tend to limit the perceptibility of the haptic output. For example, in an automobile, small ambient vibrations of the vehicle are not uncommon, particularly at high speeds and on rough/bumpy terrain, even with today's sophisticated suspension and vibration-damping technologies. These ambient vibrations tend to limit the ability of the driver to differentiate such mechanical vibrations from legitimate vibrations generated by the haptic feedback mechanism of the force-based haptic HMI.

The presently disclosed systems and methods for self-calibrating tactile haptic responses associated with force-based human machine interfaces are directed to overcoming one or more of the problems set forth above and/or other problems in the art.

SUMMARY

According to one aspect, the present disclosure is directed to a method for determining parameters associated with a haptic feedback output. The method may comprise detecting a vibration of at least a portion of a human-machine interface, and determining a magnitude associated with the detected vibration. The method may also comprise estimating a calibration offset based, at least in part, on the determined magnitude associated with the detected vibration. The method may further comprise establishing at least one parameter associated with a haptic actuator of the human-machine interface based on the estimated calibration offset, the at least one parameter at least partially defining a haptic response generated by the haptic actuator.

In accordance with another aspect, the present disclosure is directed to a force-based haptic human-machine interface. The force-based haptic human-machine interface comprises a touch plate having a touch surface, at least one force sensor coupled to the touch plate and configured to detect a force applied to the touch surface, and an actuator coupled to the touch plate and configured to deliver a mechanical output to the touch plate. The force-based human-machine interface may also comprise a processor coupled to the at least one force sensor and the actuator, the processor configured to detect a vibration associated with at least a portion of a human-machine interface based on the force detected by the at least one force value and determine a parameter associated with the detected vibration. The processor may also be configured to estimate a calibration offset based on the determined parameter associated with the detected vibration. The processor may be further configured to establish at least one output parameter associated with the actuator based on the estimated calibration offset, the at least one output parameter configured to affect the mechanical output generated by the haptic actuator.

In accordance with another aspect, the present disclosure is directed to a vehicle comprising one or more ground-engaging devices, a steering interface, coupled to one or more ground-engaging devices and comprising a rim portion and a hub portion, the rim portion configured for grasping by an operator of a vehicle, and a touch plate having a touch surface, at least a portion of the touch plate coupled to the steering interface. The vehicle may also comprise at least one force sensor coupled to the touch plate and configured to detect a force applied to the touch surface and an actuator coupled to the touch plate and configured to deliver a mechanical output to the touch plate. The vehicle may also comprise a processor coupled to the at least one force sensor and the actuator, the processor configured to detect a vibration associated with at least a portion of a human-machine interface based on the force detected by the at least one force value, and determine a parameter associated with the detected vibration. The processor may also be configured to estimate a calibration offset based on the determined parameter associated with the detected vibration. The processor may be further configured to establish at least one output parameter associated with the actuator based on the estimated calibration offset, the at least one output parameter configured to affect the mechanical output generated by the haptic actuator.

BRIEF DESCRIPTION OF THE DRAWINGS

FIGS. 8A, 8B, 8C, and 8D provide graphs illustrating exemplary tactile feedback responses for different touch events (e.g., touch-down (e.g, engage), lift-off (e.g., release), end-of-list, and press-and-hold, respectively) associated with an exemplary multi-function tactile haptic switch panel, consistent with certain disclosed embodiments;

DETAILED DESCRIPTION

In accordance with one aspect, the present disclosure is directed to a force-based haptic switch panel that is configured to limit or lock the input area of a touch panel surface around an area associated with an initial touch detected at the surface. Accordingly, systems and methods consistent with the disclosed embodiments are configured to limit inadvertent or accidental touches by localizing the input area around an initial touch area. In certain exemplary embodiments, areas or regions that are not associated with initial touch area may be disabled, ensuring that stray or accidental touch inputs are not registered an inputs to the touch panel.

Methods and systems consistent with the disclosed embodiments may be particularly applicable in situations in which distractions divert the user's visual attention to the touch interface. Indeed, in certain disclosed embodiments, the present disclosure is directed to switch panel user interfaces that provide multi-sensory confirmations of user interactions with the switch panel. In certain other embodiments, features consistent with the present disclosure provide a solution for limiting the functional detection area to a smaller, more localized area surrounding an initial touch event.

Figure 1:
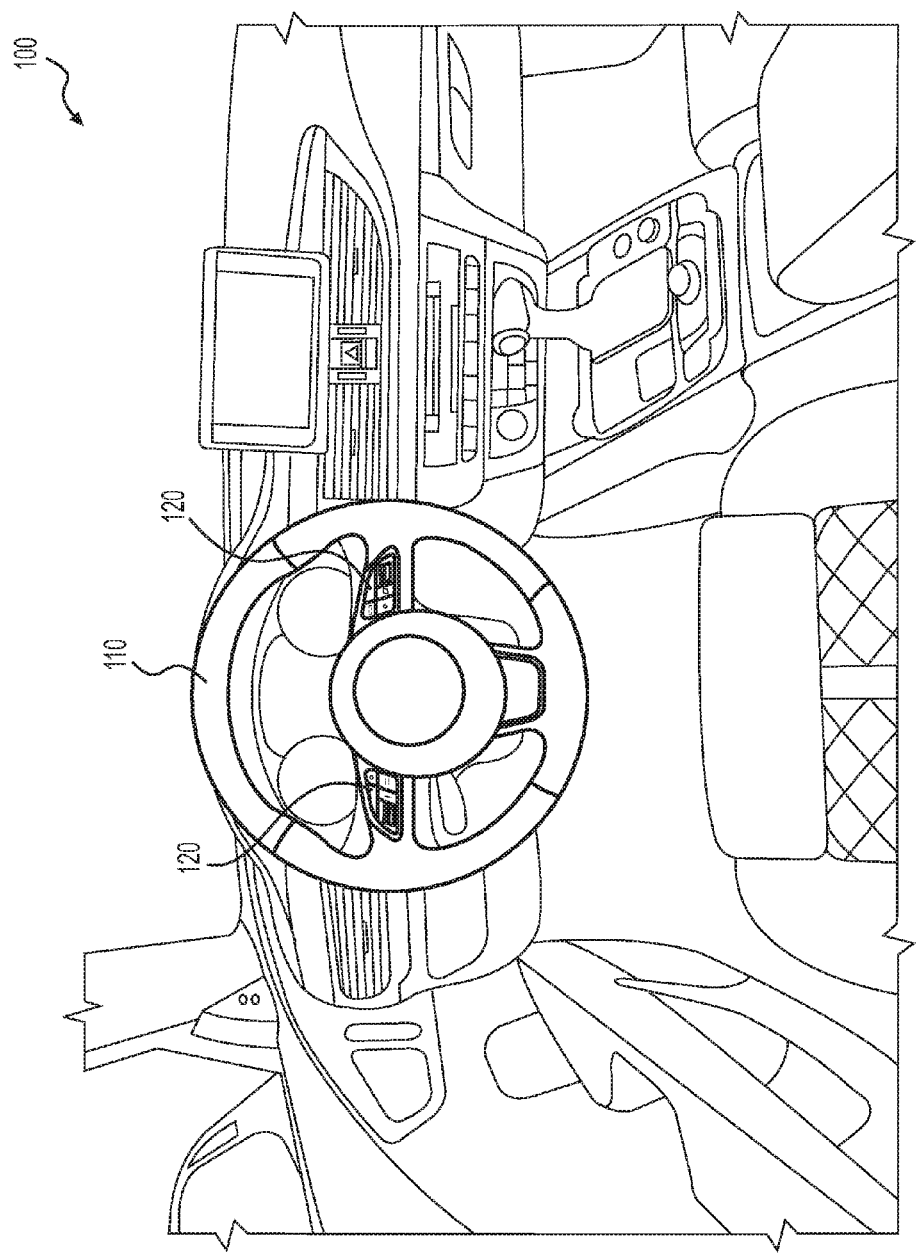
FIG. 1 illustrates an exemplary environment in which a tactile haptic switch panel consistent with certain disclosed embodiments may be implemented.

FIG. 1 illustrates an exemplary operational environment 100 in which features and methods associated with the disclosed self-calibrating tactile haptic multi-touch, multi-function switch panel may be implemented. According to one embodiment, and as illustrated in FIG. 1, operational environment 100 may include or embody a driver seat or cockpit associated with the vehicle, such as a ground-based motor vehicle. Alternatively or additionally, operational environment 100 may include or embody a driver console associated with any land, air, or sea-based transportation vehicle in which, such as a watercraft, aircraft, conventional motor vehicle, off-road vehicle, heavy construction machine, or any other type of vehicle. It is also contemplated that the presently disclosed embodiments may be employed in any stationary machine having a user console or interface, as a replacement for a conventional mechanical switch or button, such as, for example, in a vehicle training simulator, a video game console, or any other type of system that requires a human-machine interface.

FIG. 1 illustrates a plan view of an exemplary steering interface implementing a force-based switch panel (also referred to herein as a track pad interface) for vehicle control panels in accordance with the present disclosure. An example steering interface 110 can have a steering grip. A steering grip can be shaped in such a way to facilitate a driver's control of a vehicle when holding the steering grip. For example, the steering grip can include an annular ring shape with an outer contour that is essentially circular in shape. In an alternate implementation, the steering grip can define any suitable shape including, for example, circular, elliptical, square, rectangular, or any other regular or irregular shape. In an exemplary implementation, the steering grip can include a single continuous grip portion or any number of unique grip sections. Additionally the steering grip can be mounted on a fixed component such that it can be rotationally moved about a steering axis. An exemplary fixed component can include, for example, a steering column, which receives a steering spindle that extends along the steering column and serves to transmit the rotational movement of the steering grip to the wheels of the motor vehicle. Rotational movement of the steering grip may be transmitted to the wheels by mechanical and/or electrical means. In an exemplary implementation, the steering interface 110 can also include a one or more force-based tactile haptic switch panels 120, wherein each of the force-based switch panels 120 is operably coupled to the steering interface 110.

Coupling force-based switch panels 120 to the steering interface 110 provides a driver with a human-machine interface that can be configured to detect a touch or force provided by a user and determine if a switch function should or should not be activated, for example. In one embodiment, the user can be provided with a tactile or audible feedback in response to the detected input.

Figure 2:
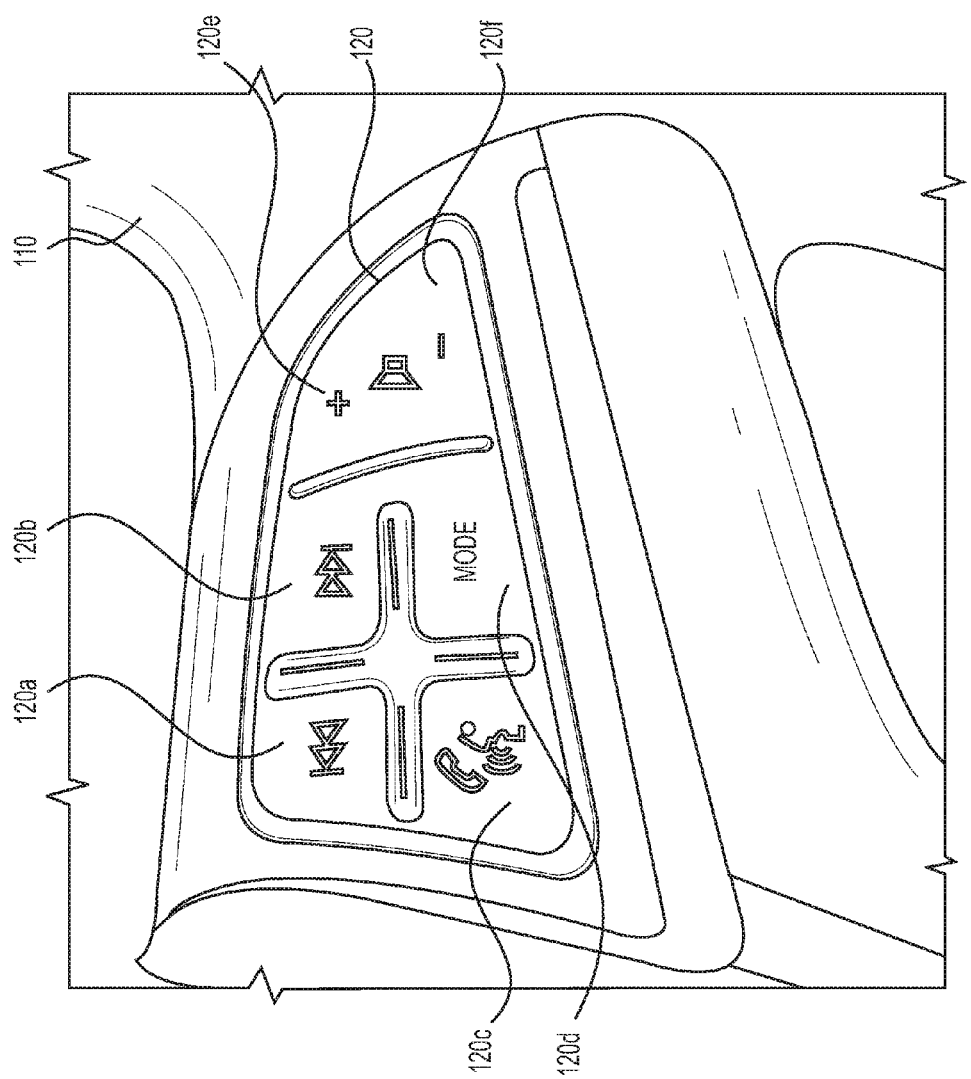
FIG. 2 illustrates an exemplary touch surface associated with a tactile haptic switch panel that is mounted within or upon a steering interface for a vehicle, in accordance with certain disclosed embodiments.

FIG. 2 illustrates a zoom view of an exemplary steering interface 110 having embedded therein a force-based switch panel 120 consistent with certain disclosed embodiments. As illustrated in FIG. 2, the force-based switch panel 120 may be embedded within a spoke that couples the rim of steering interface 100 to the center column (not shown) of the steering interface. Force-based switch panel 120 be configured to provide an interface for user control of one or more functions or systems associated with the vehicle, without requiring the user to remove his/her hands from the steering interface 110. As shown in the exemplary embodiment in FIG. 2, force-based switch panel 120 may be configured to control the audio system, which may include radio(s), media player(s), hands-free voice control system, among others. Unlike conventional mechanical switches, force-based switch panel 120 is configured to detect force values applied by the user at various locations on the switch panel, and convert these force values to electrical commands for controlling vehicle functionality.

For example, as illustrated in FIG. 2, a first area of the force-based switch panel 120 may be configured to control a "track select" operation (e.g., a "fast-rewind" or "track-rewind" 120a operation or "fast-forward" or "track-forward" operation 120b) associated with an active media player operating in the vehicle. Alternatively or additionally, a second area of the force-based switch panel 120 may be configured to activate a voice control operation 120c associated with the vehicle media system (or Bluetooth voice activate device that may be connected to the vehicle media system). A third area of the force-based switch panel 120 may be configured to provide a "mode select" operation, whereby a vehicle operation may, for example, select an "active" media player from among a plurality of different media player(s) (e.g., terrestrial radio, satellite radio, CD player, DVD player, digital media player (e.g., MP3, etc.)) that may be equipped or activated on the vehicle. Finally, a fourth area of the force-based switch panel may be configured to provide the user with interface options to increase 120e or decrease 120f the volume associated with the active media player.

Figure 3:
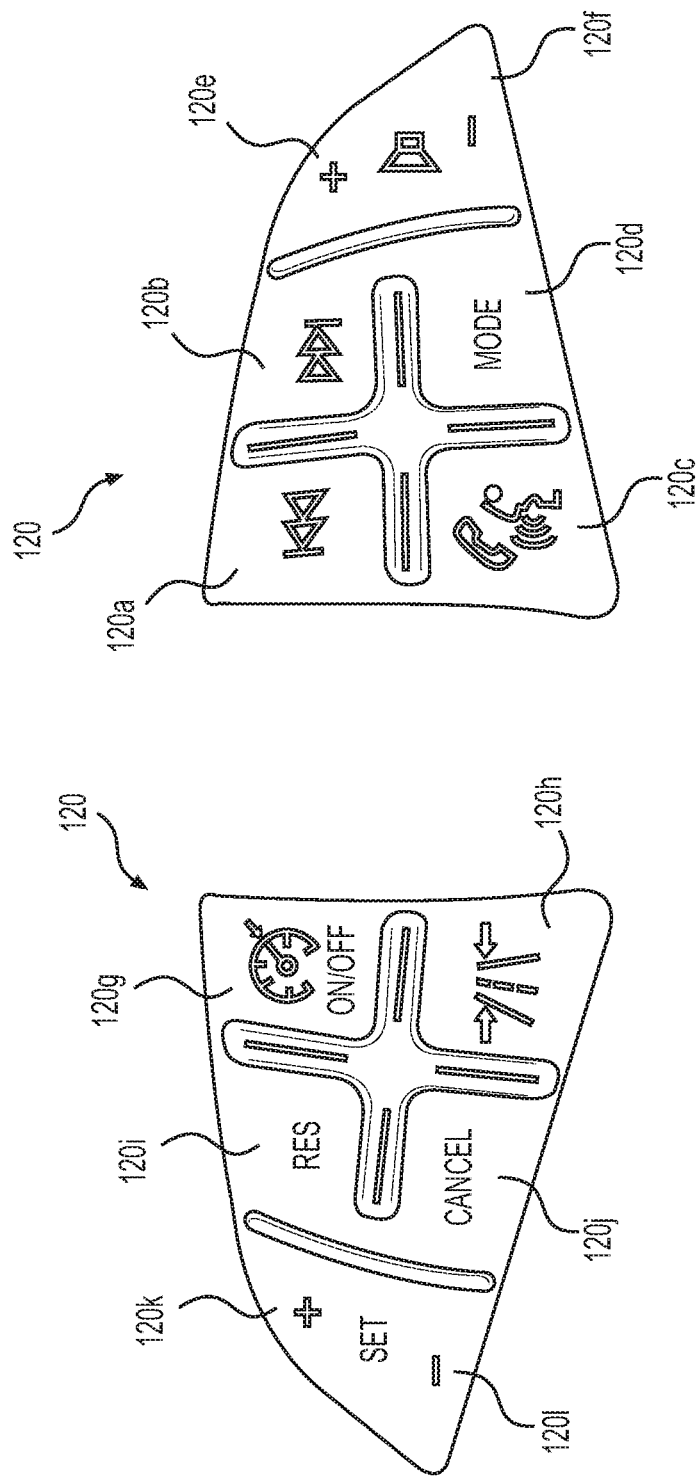
FIGS. 3A and 3B illustrate exemplary graphical layouts for one or more touch surfaces for a tactile haptic switch panel, consistent with certain disclosed embodiments.

Those skilled in the art will recognize that one of the advantages of a force-based switch panel consistent with the disclosed embodiments is the flexibility of functionality that they provide. Specifically, by providing a relatively large touch sensitive area, particularly when compared with conventional mechanical switches which have a comparatively small functional footprint, the system can be customized to provide a large amount of functionality on the steering interface. Additionally, by providing haptic and audible feedback to the user in response to detection/recognition of the touch event, operator distraction is minimized. FIGS. 3A and 3B illustrate exemplary layouts for a force-based touch panel control system for a steering interface 110 that can control multiple different systems associated with the vehicle.

Although not shown in FIG. 3A or 3B, it is contemplated that force-based touch panels 120 may be embedded in the steering interface of a vehicle (as shown in FIG. 1), with FIG. 3A being disposed on a first portion of the steering interface 110 (such as on the left spoke of the steering interface 110) and FIG. 3B being disposed on a second portion of the steering interface 110 (such as on the right spoke of the steering interface 110). As explained above with respect to FIG. 2, FIG. 3B may embody a force-based switch panel 120 for controlling an audio system. As such, FIG. 3B will not be explained in further detail here.

FIG. 3A may include or embody a force-based switch panel 120 that is configured to provide the user with options for controlling certain automatic drive features (e.g., cruise control, automatic lane detection/warning system, etc.) associated with the vehicle. For example, as illustrated in FIG. 3A, a first area of force-based switch panel 120 may be configured to activate the cruise control function of the vehicle 120g. A second area of force-based switch panel 120 may be configured to set the cruise control speed (and subsequently increase 120k or decrease 120l the speed). Third and fourth areas of the force-based sensor 120 may be configured to resume 120i and cancel 120j cruise control functionality. Finally, a fifth area of the force-based switch panel 120 may be configured to control/enable/disable, the automatic lane detection and/or warning system of the vehicle.

It should be noted that, although FIGS. 3A and 3B illustrate certain exemplary configurations of force-based switch panels 120, such embodiments should not be construed as limiting. Indeed, other configurations of force-based switch panels 120 that may be used to control various other systems associated with the vehicle may be implemented without departing from the scope of the present disclosure. In fact, the processes, methods, and system described in connection with the presently-disclosed force-based haptic switch panels 120 can be programmed to control most any functionality where a force-based detection-type user interface may be implemented. The configuration of the force-based switch panel 120 will be described in further detail below.

A force-based switch panel 120 can be any user interface device that includes a sensor configured to change at least one electrical property in response to a touch or force applied to a touch surface of the switch panel 120. A touch, also known as a touch event, can be for example a physical contact that occurs when a driver in a vehicle uses their hand (gloved or ungloved) to apply a force to force-based switch panel 120. A force-based switch panel 120, can be any suitable tactile sensor including, a mechanical sensor, a resistive sensor, a capacitive sensor, a magnetic sensor, an optical fiber sensor, a piezoelectric sensor, a silicon sensor, and/or a temperature sensor.

As will be explained in further detail below, the force-based switch panel 120 can include a two-dimensional array of force sensors, where each force sensor includes conductors and electrodes and is in at least partial contact with a touch surface positioned over the array. In one embodiment the force-based switch panel 120 can further comprise a base that is in at least partial contact with each of the force sensors. In one aspect, the base can comprise a printed circuit board. The touch interface passes touch forces to one or more force sensors of the array of force sensors. The touch interface can embody any touch-sensitive deformable member that can pass at least part of the forces from a user through the touch interface to one or more force sensors of the array of force sensors. In one embodiment, the touch interface can be used to provide haptic feedback to the user.

Figure 4:
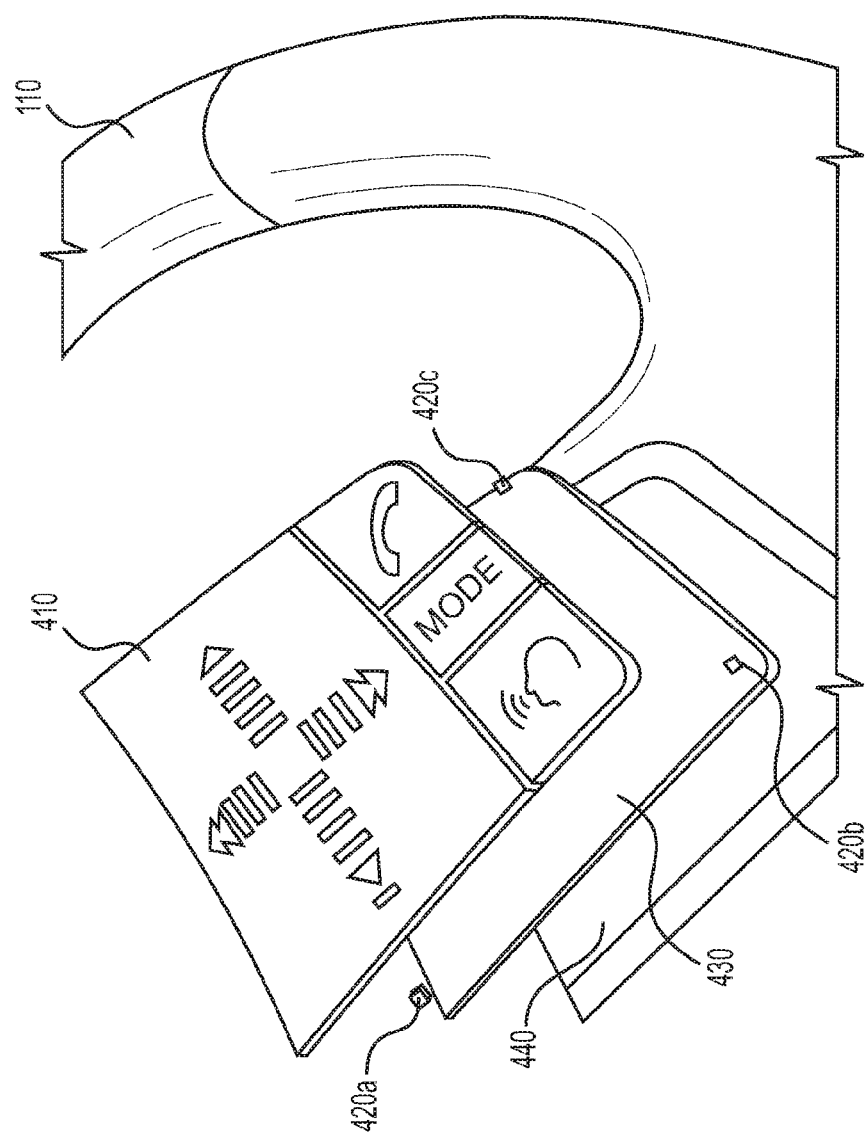
FIG. 4 provides a prospective exploded view of certain structural and functional layers of a tactile haptic switch patent, in accordance with certain disclosed embodiments.

For example, FIG. 4 provides a prospective exploded view showing certain components of a basic force-based switch panel 120 that is configured consistent with the disclosed embodiments. As illustrated in FIG. 4, force-based switch panel 120 may include a touch plate 410 having a touch surface, at least one force sensor 420a, 420b, 420c, operatively coupled to the touch plate and configured to detect a force applied to the touch surface, and a circuit board 430 disposed beneath the force sensor and configured to provide structural support for the force-based switch panel 120 and deliver electrical signals between the force sensors 420a, 420b, 420c and a corresponding processing device (e.g., controller) associated with the force-based switch panel 120. The force-based switch panel 120 may be configured for disposal within a housing 440 that can be situated within a corresponding void within steering interface 110. More detailed configurations of force-based switch panels consistent with the disclosed embodiments are illustrated in FIG. 5.

Figure 5:
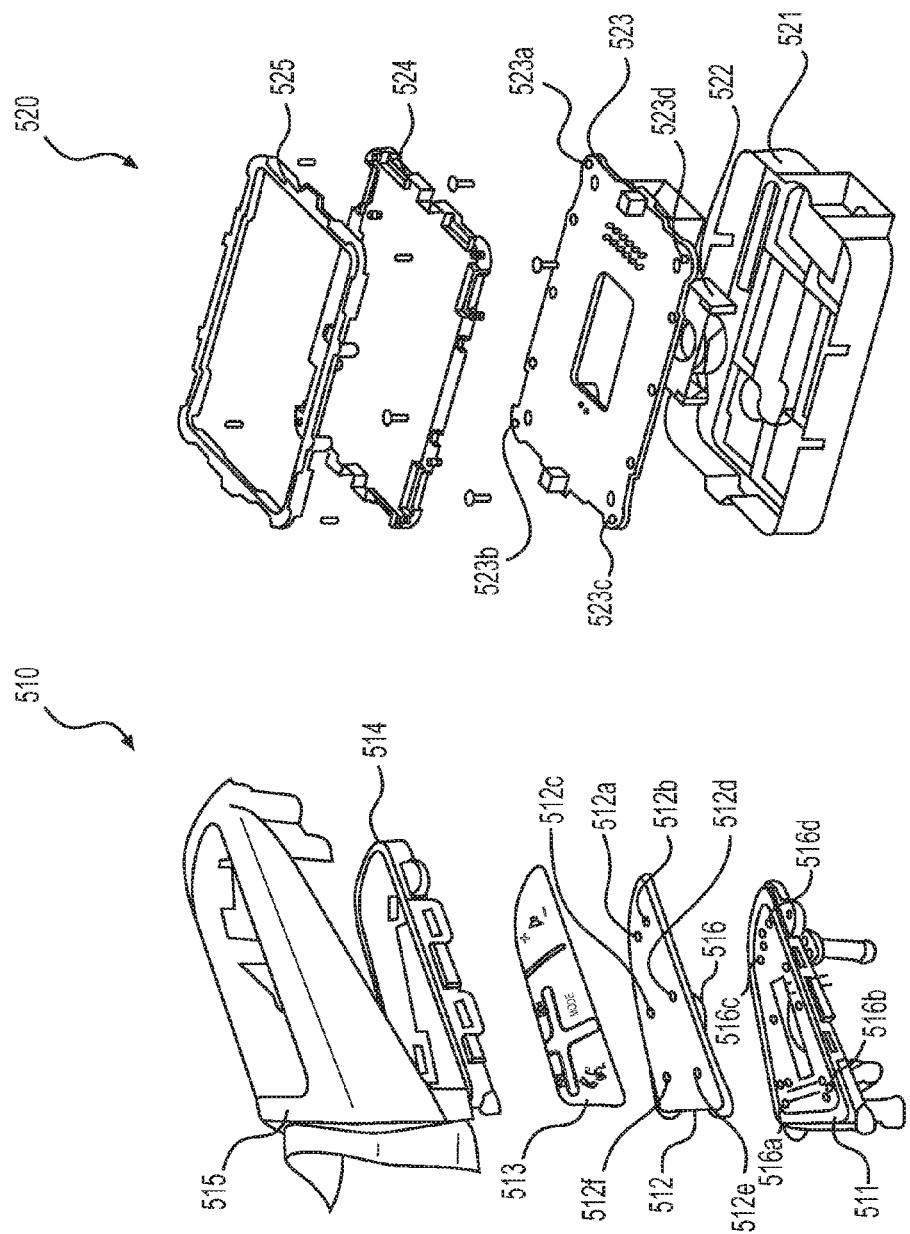
FIG. 5 provides alternative prospective exploded views of certain structural and functional layers of a tactile haptic switch patent, in accordance with certain disclosed embodiments.

FIG. 5 illustrates cross-sectional, exploded views of alternate shapes and packaging methods embodiments of a force-based switch panel 120. On the left, an exemplary force-based switch panel 510 illustrated with packaging for implementing in a triangular shape steering interface 110 of a vehicle. On the right, an exemplary force-based switch panel 520 is illustrated with packaging for implementing in a rectangular shape steering interface 110 of a vehicle.

Both embodiments provide a force-based switch panel 510 (or 520) that includes a two-dimensional array of force sensors 516a-516d (or 523a-523d) arranged to have a geometric shape having a width and a length. For example, the array of force sensors 516a-516d (or 523a-523d) may have a width or length that is 8 mm or larger. In another example, the array of force sensors 516a-516d (or 523a-523d) may have a width or length that is less than 8 mm. In one embodiment, force-based switch panel 510 (or 520) can have a depth that is 0.5 mm or less. In another example, the force-based switch panel 510 (or 520) can have a depth that is greater than 0.5 mm. While the array of force sensors 523a-523d that is shown in the force-based switch panel 520 of FIG. 5 has a rectangular shape, it is to be appreciated that this is for illustrative purposes only and the two-dimensional array of force sensors can have shapes such as circular, oval, square, rectangular, triangular and irregular shapes (such as the array of force sensors 516a-516d of force-based switch panel 510 of FIG. 5).

Both of force-based switch panels 510, 520 shown in FIG. 5 comprise a touch interface plate 512 (or 524) positioned over the array of force sensors 516a-516d (or 523a-523d). The touch interface plate 512 (or 524) includes an upper surface and a lower surface that opposes the upper surface. The touch interface plate 512 (or 524) passes touch forces incident on the upper surface through to one or more force sensors 516a-516d (or 523a-523d) of the array of force sensors disposed adjacent the lower surface. According to some embodiments, such as that illustrated in connection with force-based switch panel 510, a "skin" 513 having a plurality of backlightable icons may be overlaid atop touch interface plate 512. In such embodiments, touch interface plate may include a plurality of transparent or translucent passages 512a-512f for light to from LEDs (now shown) to pass through, thereby lighting the backlightable icons of skin 512.

According to various implementations, the touch interface plate 512 (or 524) can embody any touch-sensitive deformable member that can pass at least part of the forces from a user through the touch interface plate 512 (or 524) to one or more force sensors 516a-516d (or 523a-523d) of the array of force sensors and allows light to pass through at least a portion of the interface plate 512 (or 524). For example, the touch interface plate 512 (or 524) can be comprised of polycarbonate (PC), acrylic, PC-acrylonitrile butadiene styrene (ABS), or other plastic material, glass, rubber, other suitable materials, or combinations thereof. According to certain implementations, the thickness of the material is selected to provide a low mass but provide sufficient thickness to allow light to pass through efficiently and provide sufficient coupling to the light source(s). The material should also be sufficiently stiff to withstand the forces being applied to the upper surface without too much distortion. For example, the thickness of the material for the touch interface plate may be at least about 0.2 mm. In some implementations, the thickness of the touch interface plate may be reduced (e.g., at least about 0.1 mm) when a light altering film is disposed on a surface thereof to assist with directing the light through the material and provide some structural stiffness.

Generally, the force sensors 516a-516d (or 523a-523d) are connected to or integrated with a lower housing 511 (or base surface 523). For example, the lower housing 511 (or base surface 523) may include a printed circuit board (PCB) used to electronically communicate information or power to and from the force sensors 516a-516d (or 523a-523d) in the form of electrical signals. In various embodiments, the lower housing 511 (or base surface or 523) can further include electronic circuit components such as resistors, capacitors, diodes, LEDs, transmitters, receivers, and the like, alone with electrical interconnects for connecting the various components together. And, in one embodiment, the lower housing 511 (or base surface or 523) includes the printed circuit board on which the processor (not shown in FIG. 5) is disposed, thus electrically connecting the force sensors 516a-516d (or 523a-523d) with the processor through the lower housing 511 (or base surface 523).

It is contemplated that additional and/or different components may be included as part of the force-based switch panel 510 (or 520). For example, force-based switch panel 510 (or 520) may include one or more components for packaging the touch interface plate 512 (or 524), one or more force sensors 516a-516d (or 523a-523d), lower housing 511 (or base surface 523), and feedback actuator 516 (or 522) together as part of a single user-interface component. In one embodiment, force-based switch panel 510 may include upper and lower housing components 515 and 511, respectively, for securing the force-based switch panel 510 within a hub of a steering interface 110. Alternatively, force-based switch panel 520 may include upper and lower housing components 525 and 521, respectively, for packaging the force-based switch panel 520 as part of a single user-interface input device.

Figure 6:
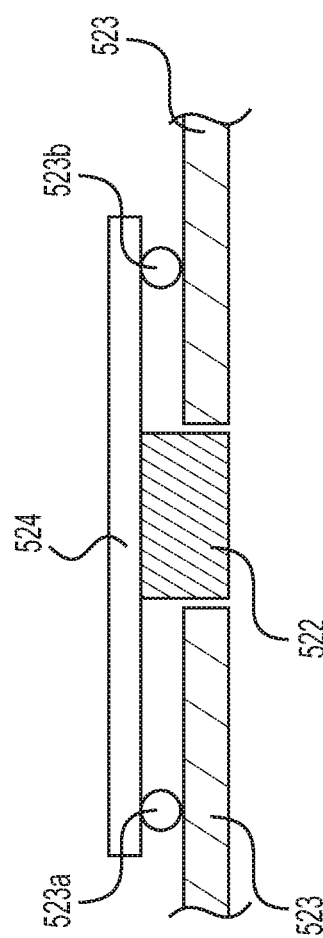
FIG. 6 provides a cross-sectional block diagram of certain exemplary components associated with a tactile haptic switch panel, consistent with certain disclosed embodiments.
Figure 7:
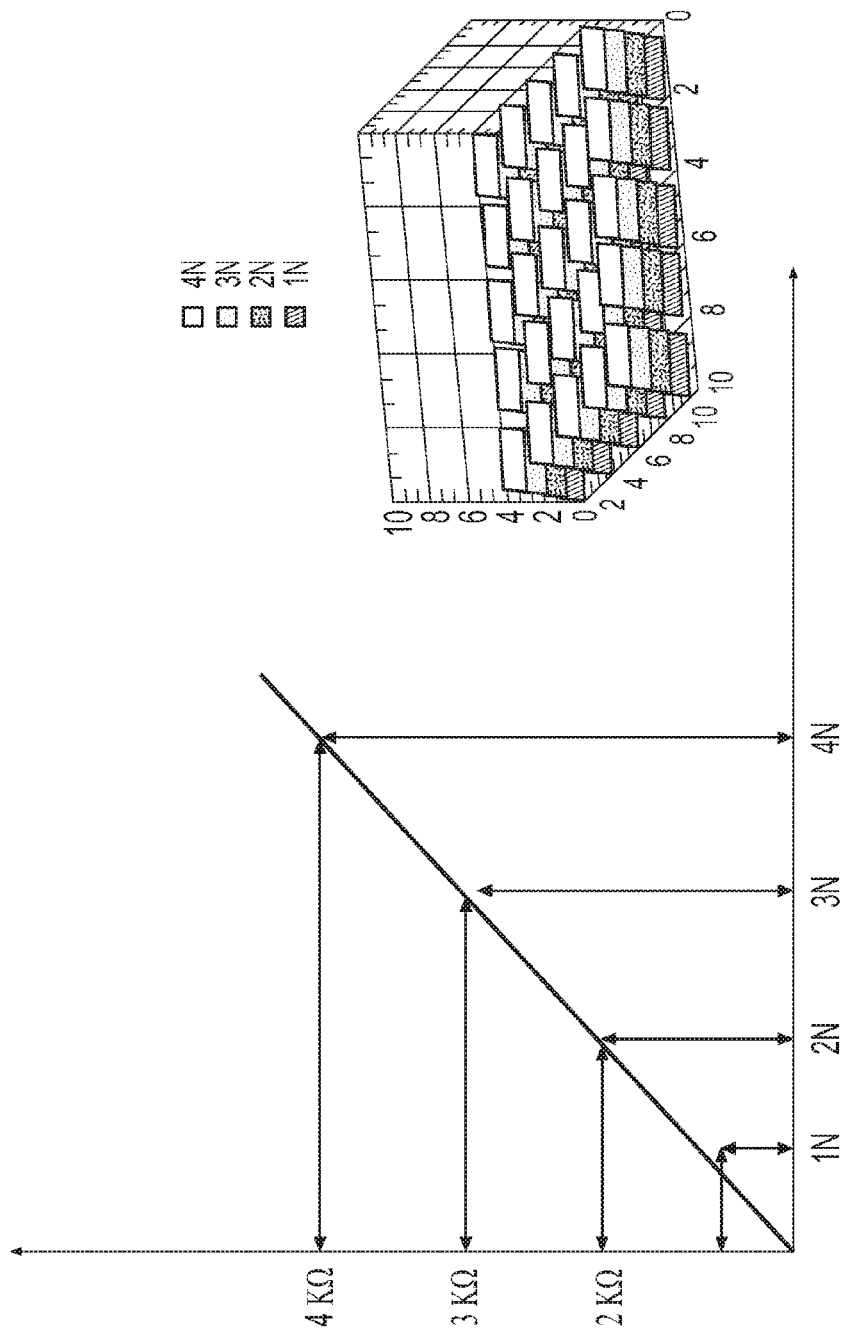
FIG. 7 provides graphs depicting exemplary force and location configuration values associated with a user interface layout for a multi-function tactile haptic switch panel, in accordance with certain disclosed embodiments.

In certain embodiments consistent with the present disclosure, the force-based switch panel may be constructed so as to provide haptic and/or audible feedback in response to a detected input signal. FIG. 6 provides a cross-sectional diagram of certain components associated with a force-based switch panel, consistent with certain disclosed embodiments. As illustrated in FIG. 6, the force-based switch panel may include a touch plate 524 having first (topside of touch plate 524) and second (underside of touch plate 524) surfaces. In this configuration, the first surface may embody a touch surface for received touch inputs from a user.

The force-based haptic switch panel may also include a circuit board 523 having a plurality of force sensors 523a, 523b electrically coupled thereto. As shown in FIG. 6, the force sensors 523a, 523b may be disposed between the circuit board 523 and the second (e.g., underside) surface of the touch plate 524, such that each force sensor is configured to measure a corresponding portion of a force applied to the touch surface of the touch plate.

The force-based haptic switch panel may include an actuator 522 that is affixed to the second (underside) surface of the touch plate 524. The actuator 522 may be configured to deliver a mechanical output to the touch plate. Non-limiting examples of mechanical outputs may include any mechanical output, such as a vibration, that may can be delivered to a surface of the touch plate 524 and perceived by the user.

Actuator 522 may include or embody any suitable device for converting electrical energy to a mechanical output, including those that can be perceived by a user of force-based switch panel. Non-limiting examples of such actuators include acoustic actuators, rotational motors, vibrational actuators, piezoelectric resonators, linear resonant actuators, or eccentric rotating mass motors. IN certain embodiments, acoustic actuators may be used to provide both mechanical vibration and audible outputs simultaneously.

In certain embodiments consistent with the present disclosure, the force-based switch panel may be constructed so as to provide haptic and/or audible feedback in response to a detected input signal. FIG. 6 provides a cross-sectional diagram of certain components associated with a force-based switch panel, consistent with certain disclosed embodiments. As illustrated in FIG. 6, the force-based switch panel may include a touch plate 524 having first (topside of touch plate 524) and second (underside of touch plate 524) surfaces. In this configuration, the first surface may embody a touch surface for received touch inputs from a user.

The force-based haptic switch panel may also include a circuit board 523 having a plurality of force sensors 523a, 523b electrically coupled thereto. As shown in FIG. 6, the force sensors 523a, 523b may be disposed between the circuit board 523 and the second (e.g., underside) surface of the touch plate 524, such that each force sensor is configured to measure a corresponding portion of a force applied to the touch surface of the touch plate.

The force-based haptic switch panel may include an actuator 522 that is affixed to the second (underside) surface of the touch plate 524. The actuator 522 may be configured to deliver a mechanical output to the touch plate. Non-limiting examples of mechanical outputs may include any mechanical output, such as a vibration, that may can be delivered to a surface of the touch plate 524 and perceived by the user.

Actuator 522 may include or embody any suitable device for converting electrical energy to a mechanical output, including those that can be perceived by a user of force-based switch panel. Non-limiting examples of such actuators include acoustic actuators, rotational motors, vibrational actuators, piezoelectric resonators, linear resonant actuators, or eccentric rotating mass motors. IN certain embodiments, acoustic actuators may be used to provide both mechanical vibration and audible outputs simultaneously.

According to the embodiment illustrated in FIG. 6, the circuit board 523 may comprise a passage for allowing a portion of the actuator 522 to pass therethrough. Such a passage reduces the overall depth or thickness of the force-based switch panel while allowing the actuator to be mounted directly to the underside of the touch plate 524, increasing the amount of energy that is delivered to the touch plate. The actuator may be configured to deliver different levels of haptic feedback, based on the input provided by a processor or controller associated with the force-based switch panel.

Figure 8A:
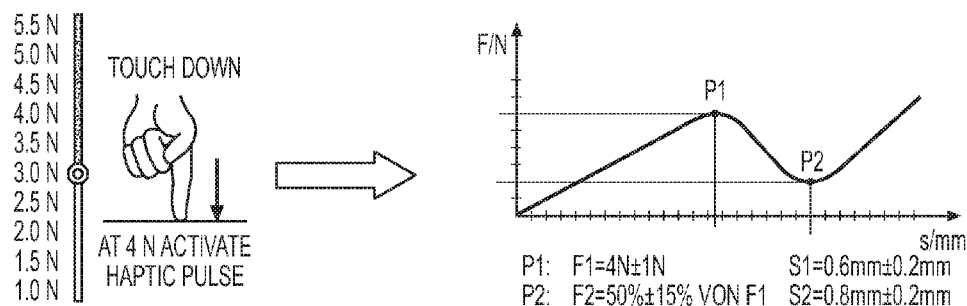
Figure 8B:
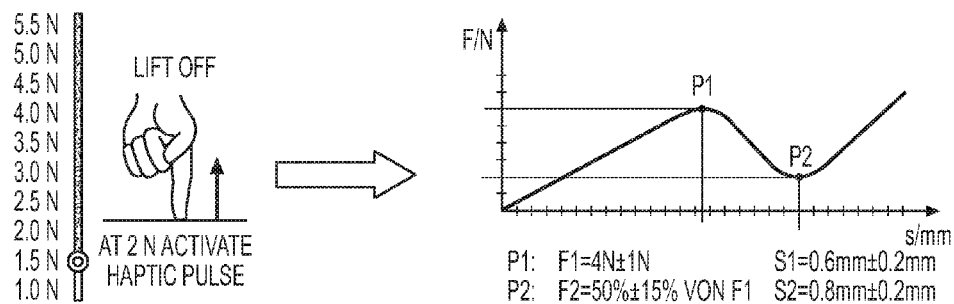

As illustrated in FIGS. 7, 8A, 8B, and 8C, the force-based switch panel may be used to sense a position and magnitude of force applied to the force-based sensor system. In other words, the force-based sensor system may be configured to sense the position of the applied force in either one dimension (e.g., the X- or Y-direction) or two dimensions (e.g., the X- and Y-directions), as well of as the magnitude of the applied force (e.g., force in the Z-direction). The force-based sensor system can also be configured to sense the time that a force is applied at a particular location. In response to the magnitude, location, and/or duration of the applied force, the force-based switch panel may be configured to generate a haptic and/or audible feedback signal responsive to the detected force. As shown in FIGS. 8A, 8B, and 8C, each touch event (e.g., touch-down, lift-off, and hold-down) may be initiated by a different user interaction (e.g., different force value and/or duration of the touch) and, accordingly, may trigger different haptic and/or audible output feedbacks being provided to the user.

Figure 9:
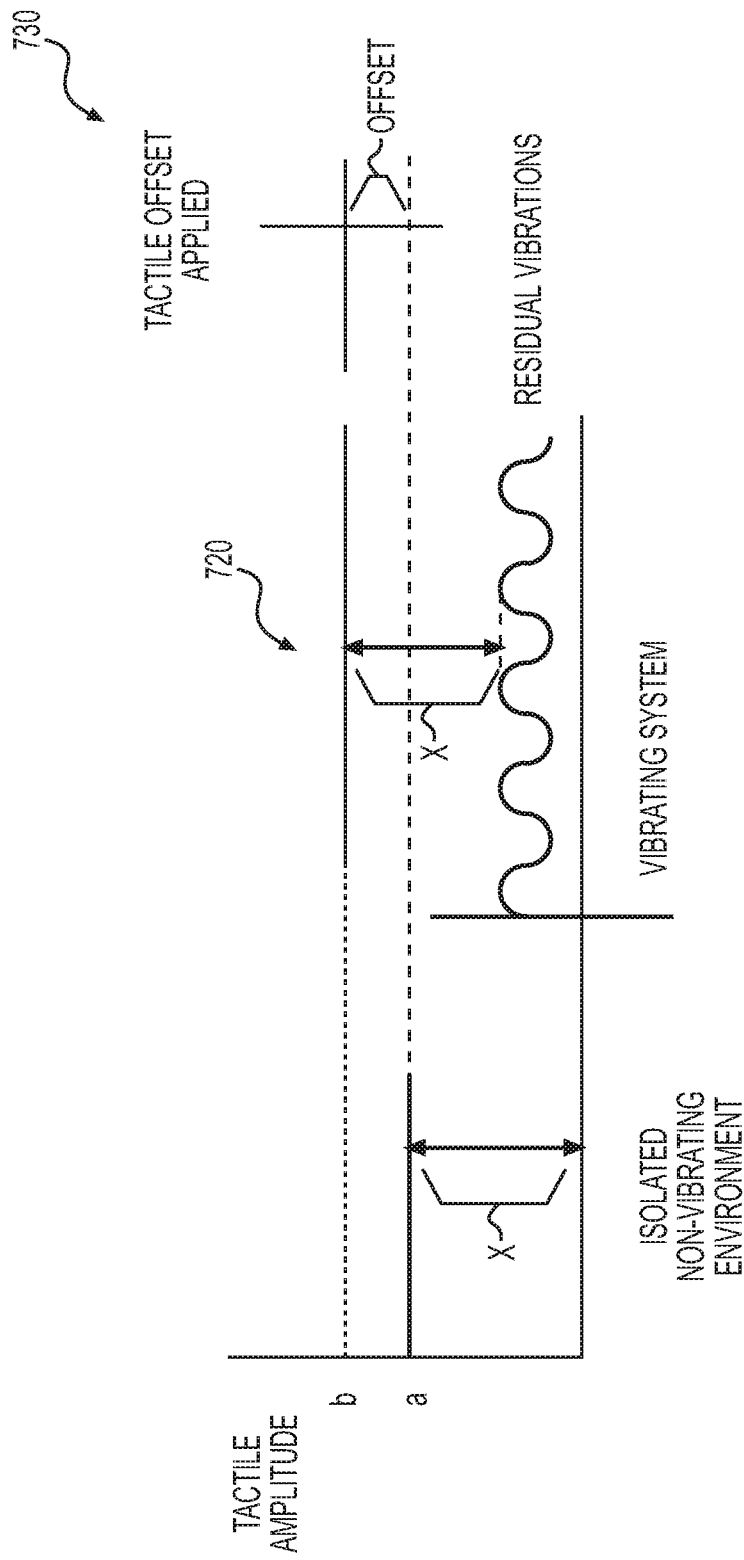
FIG. 9 illustrates an exemplary graph depicting the calibration offset and corresponding adjustment that is made, consistent with certain disclosed embodiments.

FIG. 9 illustrates an exemplary noise calibration scenario that can be implemented by the presently disclosed self-calibrating force-based switch panel 120. As shown in FIG. 9, in an ideal (i.e., low-noise) environment, the haptic actuator for generating tactile haptic feedback to the touch surface of the force-based switch panel 120 may be designed to deliver a perceptible vibrational force of amplitude "a" to the surface of the touch surface, which can be generated by a amplitude setting of "X" at the actuator. However, in vibrating environments, such as when force-based switch panel 120 is implemented on a steering interface of an automobile, residual vibrations may interfere with the perceptibility of the vibration at the touch surface. In order to compensate for these residual vibrations to ensure that the haptic feedback signal is perceptible as feedback by the system (rather than residual vibration in the system), the output setting of "X" amplitude used in the non-noisy environment may be insufficiently distinguishable by the user. Accordingly, an offset must be applied to ensure that the haptic output in vibrating environments is sufficient to be perceived by the user. As will be explained in greater detail with respect to FIG. 11, the presently disclosed system is configured to apply an amplitude offset, to ensure that the force output provided by the haptic actuator is offset by at least the amplitude value associated with the residual vibrations of the system.

Figure 10:
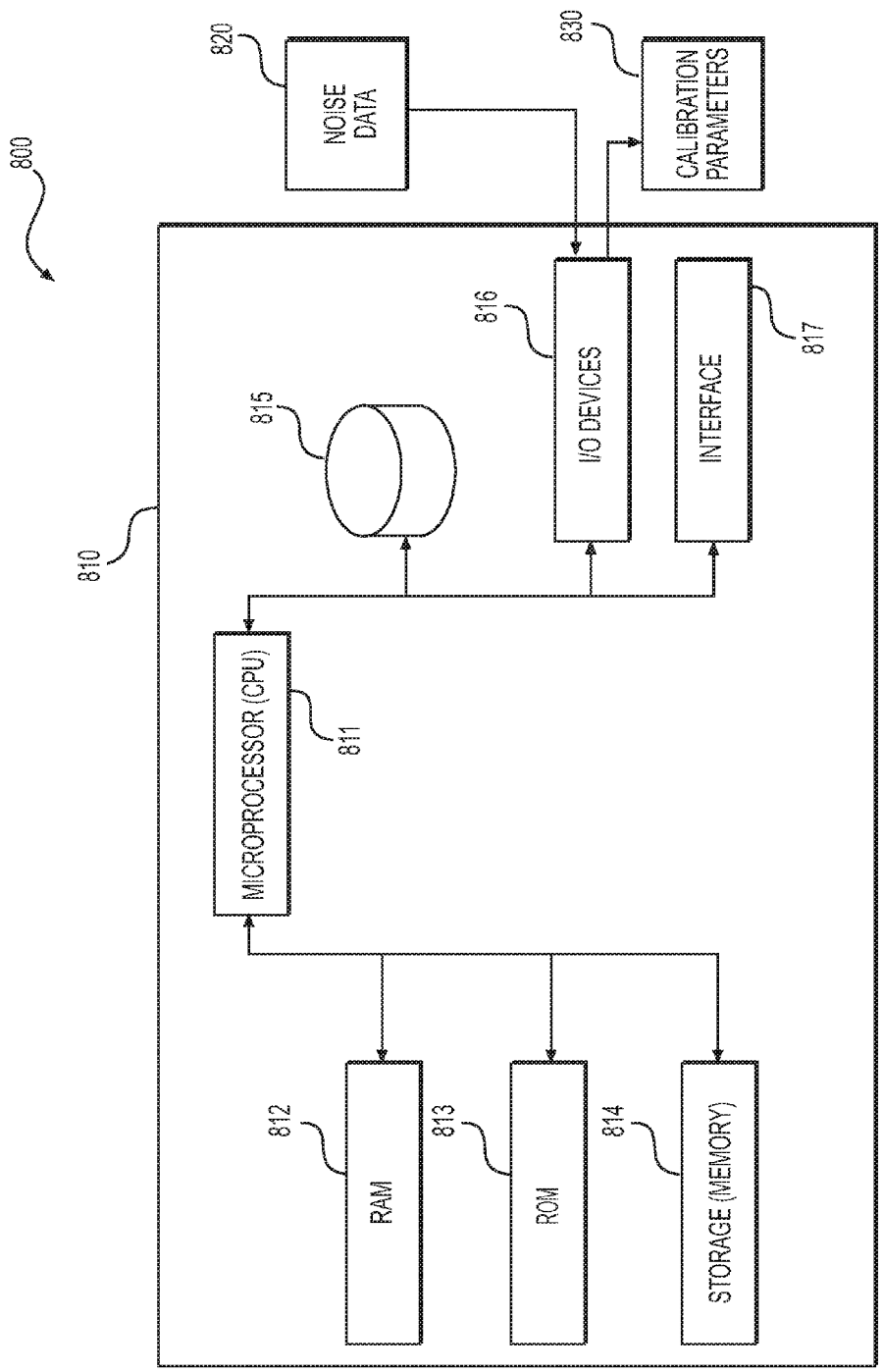
FIG. 10 provides a block diagram illustrating certain components associated with an exemplary controller that is capable of performing methods for calibrating for noise offsets, in accordance with the disclosed embodiments.

Force-based switch panel 120 may also include a controller or processor-based computing system that is configured to receive values indicative of applied force from the force sensors and determine, based on the magnitude and location of the applied force (relative to the touch surface) which function of the vehicle that the user is trying to control. Indeed, force-based switch panel may include one or more hardware and/or software components configured to execute software programs. FIG. 10 illustrates an exemplary controller or processor-based computing system that may be implemented as a controller associated with force-based switch panel 120.

As illustrated in FIG. 10, controller device 810 may include one or more hardware components such as, for example, a central processing unit (CPU) or microprocessor 811, a random access memory (RAM) module 812, a read-only memory (ROM) module 813, a memory or data storage module 814, a database 815, one or more input/output (I/O) devices 816, and an interface 817. Alternatively and/or additionally, controller 811 may include one or more software media components such as, for example, a computer-readable medium including computer-executable instructions for performing methods consistent with certain disclosed embodiments. It is contemplated that one or more of the hardware components listed above may be implemented using software. For example, storage may include a software partition associated with one or more other hardware components of controller. The controller 810 may include additional, fewer, and/or different components than those listed above. It is understood that the components listed above are exemplary only and not intended to be limiting.

CPU 811 may include one or more processors, each configured to execute instructions and process data to perform one or more functions associated with controller. CPU 811 may be communicatively coupled to RAM 812, ROM 813, storage 814, database 815, I/O devices 816, and interface 817. CPU 811 may be configured to execute sequences of computer program instructions to perform various processes, which will be described in detail below. The computer program instructions may be loaded into RAM 812 for execution by CPU 811.

RAM 812 and ROM 813 may each include one or more devices for storing information associated with an operation of networking device and/or CPU 811. For example, ROM 813 may include a memory device configured to access and store information associated with the controller, such as force threshold levels associated with the force-based switch panel. RAM 812 may include a memory device for storing data associated with one or more operations of CPU 811. For example, ROM 813 may load instructions into RAM 812 for execution by CPU 811.

Storage 814 may include any type of mass storage device configured to store information that CPU 811 may need to perform processes consistent with the disclosed embodiments. For example, storage 814 may include one or more magnetic and/or optical disk devices, such as hard drives, CD-ROMs, DVD-ROMs, or any other type of mass media device. Alternatively or additionally, storage 814 may include flash memory mass media storage or other semiconductor-based storage medium.

Database 815 may include one or more software and/or hardware components that cooperate to store, organize, sort, filter, and/or arrange data used by controller and/or CPU 811. CPU 811 may access the information stored in database 815*e* to in order to identify, for example, a particular function associated with a force input value. It is contemplated that database may store additional and/or different information than that listed above.

I/O devices 816 may include one or more components configured to communicate information with a component or user associated with controller 810. For example, I/O devices 816 may include a console with an integrated keyboard and mouse to allow a user to input parameters associated with the controller. I/O devices 816 may also include a display including a graphical user interface (GUI) for providing a network management console for network administrators to configure controller 810. I/O devices 816 may also include peripheral devices such as, for example, a printer for printing information associated with networking device, a user-accessible disk drive (e.g., a USB port, a floppy, CD-ROM, or DVD-ROM drive, etc.) to allow a user to input data stored on a portable media device, a microphone, a speaker system, or any other suitable type of interface device. I/O devices 816 may be configured to output calibration parameters associated with the input noise data.

Interface 817 may include one or more components configured to transmit and receive data via a communication network, such as the Internet, a local area network, a workstation peer-to-peer network, a direct link network, a wireless network, or any other suitable communication platform. For example, interface 817 may include one or more modulators, demodulators, multiplexers, demultiplexers, network communication devices, wireless devices, antennas, modems, and any other type of device configured to enable data communication via a communication network. According to one embodiment, interface 817 may be coupled to or include wireless communication devices, such as a module or modules configured to transmit information wirelessly using Wi-Fi or Bluetooth wireless protocols.

Figure 11:
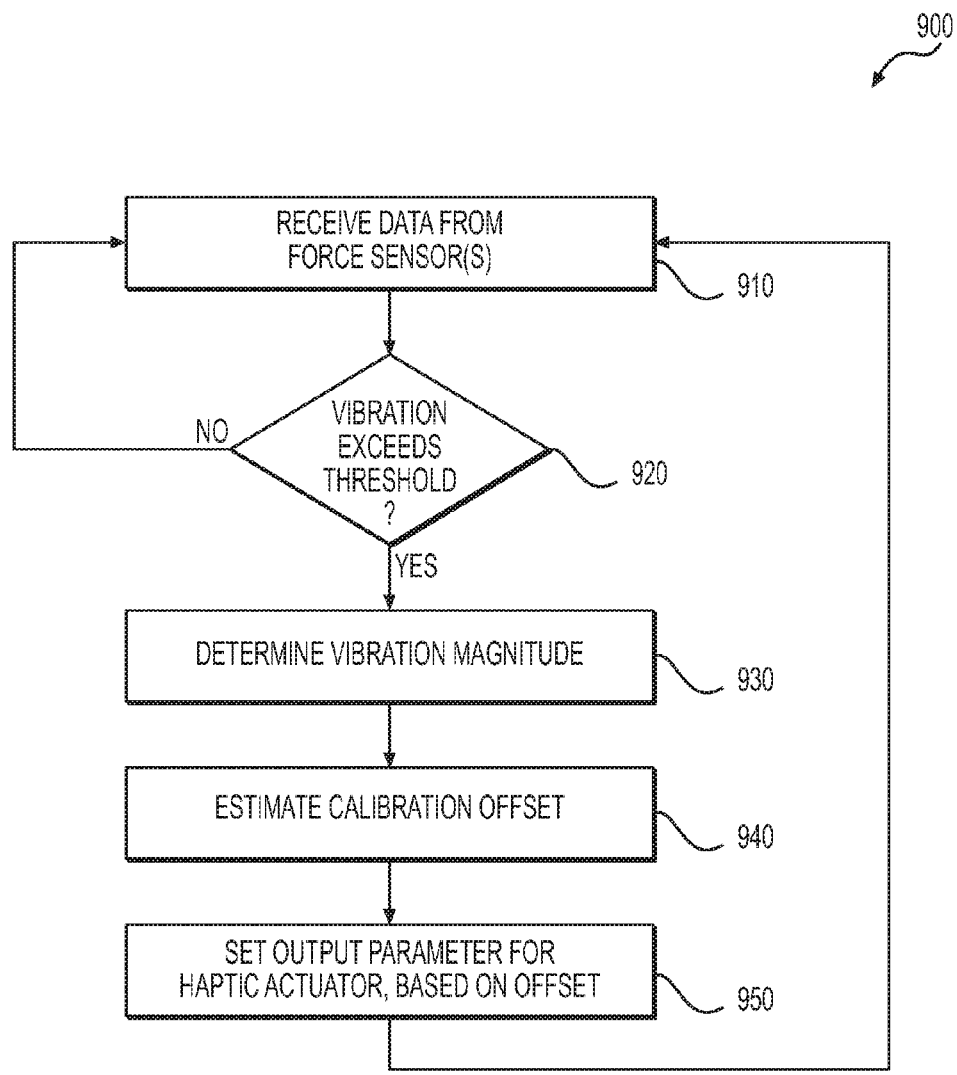
FIG. 11 provides a flowchart illustrating an exemplary process determining noise calibration offsets, consistent with the disclosed embodiments.

FIG. 11 illustrates a flowchart 900 depicting an exemplary process for setting an output parameter based on a detected ambient or residual vibration associated with the force-based switch panel 120. The method commences upon detection of a vibration associated with at least a portion of the force-based switch panel 120. Such detection may occur upon receipt of force data from one or more sensors of the array of sensors associated with the force-based switch panel 120 (Block 910). Based on the received force data, processor 811 may determine a magnitude associated with the detected vibration and determine whether the vibration exceeds a threshold that requires offset/correction (Block 920).

If the vibration does not exceed a threshold level (Block 920: No, indicating that the vibration is not significant or consistent enough to necessitate correction/offset from the system), the process continues back to Block 910 where the vibration is monitored by force sensors of the force-based switch panel 120. If, on the other hand, the vibration exceeds the threshold level (Block 920: Yes), processor may continue to determine the magnitude of the detected vibration (Block 930). Based on the magnitude of the vibration, the processor 811 may estimate a calibration offset that is to be applied to the system to compensate for the effects caused by the ambient mechanical vibration of the system (Block 940). Based on the calibration offset, the processor 811 may establish at least one parameter associated with a haptic actuator of the force-based switch panel 120 based on the estimated calibration offset, the at least one parameter at least partially defining a haptic response generated by the haptic actuator (Block 950).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

It will be apparent to those skilled in the art that various modifications and variations can be made to the disclosed systems and methods for locking detected touch location in a force-based haptic multifunction switch panel. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:
1. A method for determining parameters associated with a haptic feedback output, comprising:

detecting a vibration of at least a portion of a human-machine interface, wherein detecting the vibration comprises:
  receiving force data from at least one force sensor;
  comparing the received force data with a first force threshold and a second force threshold, wherein the second force threshold is greater than the first force threshold, and the second force threshold is a minimum amount of force associated with a touch event by a user to a touch plate coupled to the at least one force sensor; and
  in response to the received force data oscillating between the first force threshold and the second force threshold for at least a predetermined time period, identifying the vibration based on the received force data, the vibration having a magnitude;
estimating a calibration offset based, at least in part, on the magnitude; and
establishing at least one parameter associated with a haptic actuator of the human-machine interface based on the estimated calibration offset, the at least one parameter at least partially defining a haptic response generated by the haptic actuator.

2. The method of claim 1, wherein establishing at least one parameter associated with the haptic actuator includes setting an output amplitude associated with the haptic actuator.

3. The method of claim 2, wherein the haptic actuator comprises a device for generating a mechanical vibration and wherein the output amplitude is configured to control the magnitude of the mechanical vibration.

4. The method of claim 2, wherein the haptic actuator includes an acoustic actuator and wherein the output amplitude is configured to control a mechanical displacement of a portion of the acoustic actuator.

5. The method of claim 1, wherein establishing at least one parameter associated with the haptic actuator includes setting a frequency value associated with the haptic actuator.

6. The method of claim 1, wherein estimating the calibration offset includes determining the calibration offset as a value substantially similar to the determined magnitude associated with the detected vibration.

7. The method of claim 1, wherein estimating the calibration offset includes selecting the calibration offset from among a plurality of predetermined calibration offsets, wherein the selected calibration offset has a magnitude greater than or equal to the determined magnitude associated with the detected vibration.

8. The method of claim 1, wherein detecting the vibration of at least a portion of the human-machine interface includes selectively detecting the vibration of the at least a portion of the human machine interface during a time period when the human machine interface is not in use.

9. A force-based haptic human-machine interface, comprising:
  a touch plate having a touch surface;
  at least one force sensor coupled to the touch plate and configured to detect a force applied to the touch surface;
  an actuator coupled to the touch plate and configured to deliver a mechanical output to the touch plate; and
  a processor coupled to the at least one force sensor and the actuator, the processor configured to:
    detect a vibration of at least a portion of a human-machine interface based on the force detected by the at least one force sensor, wherein detecting the vibration comprises:
      receiving force data from the at least one force sensor;
      comparing the received force data with a first force threshold and a second force threshold, wherein the second force threshold is greater than the first force threshold, and the second force threshold is a minimum amount of force associated with a touch event to the touch plate by a user; and
      in response to the received force data oscillating between the first force threshold and the second force threshold for at least a predetermined time period, identifying the vibration based on the received force data;
    determine a parameter associated with the detected vibration;
    estimate a calibration offset based on the determined parameter associated with the detected vibration; and
    establish at least one output parameter associated with the actuator based on the estimated calibration offset, the at least one output parameter configured to affect the mechanical output generated by the actuator.

10. The force-based haptic human-machine interface of claim 9, wherein the at least one force sensor includes a plurality of force sensors, each of which is coupled to the touch plate and configured to detect a respective portion of the force applied to a corresponding area of the touch surface based on the location of the force sensor.

11. The force-based haptic human-machine interface of claim 10, wherein the parameter associated with the detected vibration includes a magnitude of the detected vibration, and wherein the processor is further configured to determine the magnitude by averaging the force data associated with the forces received by each of the plurality of force sensors.

12. The force-based haptic human machine interface of claim 11, wherein the processor is further configured to determine that the magnitude associated with the detected vibration exceeds a threshold magnitude, wherein establishing the at least one output parameter associated with the actuator includes setting an output amplitude associated with the actuator in response to determining that the magnitude associated with the detected vibration exceeds the threshold magnitude.

13. The force-based haptic human-machine interface of claim 9, wherein the parameter associated with the detected vibration includes a frequency associated with the detected vibration.

14. The force-based haptic human machine interface of claim 13, wherein establishing the at least one output parameter associated with the actuator includes setting an output frequency associated with the actuator based, at least in part, on the frequency associated with the detected vibration.

15. A vehicle, comprising:
  one or more ground-engaging devices;
  a steering interface, coupled to one or more ground-engaging devices and comprising a rim portion and a hub portion, the rim portion configured for grasping by an operator of a vehicle;
  a touch plate having a touch surface, at least a portion of the touch plate coupled to the steering interface;
  at least one force sensor coupled to the touch plate and configured to detect a force applied to the touch surface;
  an actuator coupled to the touch plate and configured to deliver a mechanical output to the touch plate;
  a processor coupled to the at least one force sensor and the actuator, the processor configured to:

detect a vibration associated with at least a portion of a human-machine interface based on the force detected by the at least one force sensor, wherein detecting the vibration comprises:
    receiving force data from the at least one force sensor;
    comparing the received force data with a first force threshold and a second force threshold, wherein the second force threshold is greater than the first force threshold, and the second force threshold is a minimum amount of force associated with a touch event to the touch plate by a user; and
    in response to the received force data oscillating between the first force threshold and the second force threshold for at least a predetermined time period, identifying the vibration based on the received force data;
determine a parameter associated with the detected vibration;
estimate a calibration offset based on the determined parameter associated with the detected vibration; and
establish at least one output parameter associated with the actuator based on the estimated calibration offset, the at least one output parameter configured to affect the mechanical output generated by the haptic actuator.

16. The vehicle of claim 15, wherein the at least one force sensor includes a plurality of force sensors, each of which is coupled to the touch plate and configured to detect a respective portion of the force applied to a corresponding area of the touch surface based on the location of the force sensor.

17. The vehicle of claim 16, wherein the parameter associated with the detected vibration includes a magnitude of the detected vibration, and wherein the processor is further configured to determine the magnitude by averaging the forces detected by each of the plurality of force sensors.

18. The vehicle of claim 17, wherein the processor is further configured to determine that the magnitude associated with the detected vibration exceeds a threshold magnitude, wherein establishing the at least one output parameter associated with the actuator includes setting an output amplitude associated with the haptic actuator in response to determining that the magnitude associated with the detected vibration exceeds the threshold magnitude.

19. The vehicle of claim 15, wherein the parameter associated with the detected vibration includes a frequency associated with the detected vibration.

20. The vehicle of claim 19, wherein establishing the at least one output parameter associated with the actuator includes setting an output frequency associated with the actuator based, at least in part, on the frequency associated with the detected vibration.

* * * * *